United States Patent
Knaapen et al.

(10) Patent No.: US 9,655,193 B2
(45) Date of Patent: May 16, 2017

(54) LIGHTING UNIT PROVIDING REDUCED INTENSITY LIGHT OUTPUT BASED ON USER PROXIMITY AND RELATED METHODS

(71) Applicant: PHILIPS LIGHTING HOLDING B.V., Eindhoven (NL)

(72) Inventors: Bram Knaapen, Eindhoven (NL); Tim Dekker, Eindhoven (NL)

(73) Assignee: PHILIPS LIGHTING HOLDING B.V., Eindhoven (NL)

(*) Notice: Subject to any disclaimer, the term of this patent is extended or adjusted under 35 U.S.C. 154(b) by 0 days.

(21) Appl. No.: 15/110,513

(22) PCT Filed: Dec. 29, 2014

(86) PCT No.: PCT/IB2014/067373
§ 371 (c)(1),
(2) Date: Jul. 8, 2016

(87) PCT Pub. No.: WO2015/104622
PCT Pub. Date: Jul. 16, 2015

(65) Prior Publication Data
US 2016/0338166 A1 Nov. 17, 2016

Related U.S. Application Data

(60) Provisional application No. 61/924,995, filed on Jan. 8, 2014.

(51) Int. Cl.
*H05B 37/02* (2006.01)
*H05B 33/08* (2006.01)
(Continued)

(52) U.S. Cl.
CPC ....... *H05B 33/0854* (2013.01); *F21V 19/006* (2013.01); *F21V 23/003* (2013.01);
(Continued)

(58) Field of Classification Search
CPC ............ H05B 33/0815; H05B 33/0818; H05B 41/2828; H05B 41/3921; H05B 41/3927;
(Continued)

(56) References Cited

U.S. PATENT DOCUMENTS 6,122,042 A * 9/2000 Wunderman ............ A61B 1/05
356/343
8,217,595 B2 7/2012 Van Endert
(Continued)

FOREIGN PATENT DOCUMENTS

WO 2009052654 A1 4/2009
WO 2012148383 A1 11/2012

*Primary Examiner* — Minh D A
(74) *Attorney, Agent, or Firm* — Meenakshy Chakravorty

(57) ABSTRACT

Disclosed are methods and apparatus for lighting control. Reduced intensity light output is provided from one or more light sources (100, 300, 400) based on user proximity. Providing reduced intensity light output from the light sources based on user proximity may facilitate user interaction with a user interface (140, 340, 440) that enables control of the light sources and/or additional light sources. For example, the reduced intensity light output may make viewing of and/or interaction with the user interface more pleasant that non-reduced intensity light output.

15 Claims, 3 Drawing Sheets

(51) Int. Cl.

| | |
|---|---|
| *F21V 29/70* | (2015.01) |
| *F21V 19/00* | (2006.01) |
| *F21V 23/00* | (2015.01) |
| *F21V 23/06* | (2006.01) |
| *G06F 3/044* | (2006.01) |
| *F21Y 115/10* | (2016.01) |

(52) U.S. Cl.
CPC .............. *F21V 23/06* (2013.01); *F21V 29/70* (2015.01); *G06F 3/044* (2013.01); *H05B 33/0845* (2013.01); *H05B 33/0866* (2013.01); *H05B 37/0227* (2013.01); *H05B 37/0272* (2013.01); *F21Y 2115/10* (2016.08)

(58) Field of Classification Search
CPC .............. H05B 37/029; H05B 33/0803; H05B 37/0254; H05B 37/02
USPC .......................... 315/312, 291, 307, 224, 246
See application file for complete search history.

(56) References Cited

U.S. PATENT DOCUMENTS

| | | |
|---|---|---|
| 2007/0008726 A1 | 1/2007 | Brown |
| 2009/0108762 A1 | 4/2009 | Chen |
| 2013/0201668 A1 | 8/2013 | Chien |

\* cited by examiner

LIGHTING UNIT PROVIDING REDUCED INTENSITY LIGHT OUTPUT BASED ON USER PROXIMITY AND RELATED METHODS

CROSS-REFERENCE TO PRIOR APPLICATIONS

This application is the U.S. National Phase application under 35 U.S.C. §371 of International Application No. PCT/IB2014/067373, filed on Dec. 29, 2014, which claims the benefit of U.S. Provisional Patent Application No. 61/924,995, filed on Jan. 8, 2014. These applications are hereby incorporated by reference herein.

TECHNICAL FIELD

The present invention is directed generally to lighting control. More particularly, various inventive methods and apparatus disclosed herein relate to providing reduced intensity light output based on user proximity.

BACKGROUND

Digital lighting technologies, i.e. illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the fixtures embodying these sources feature a lighting module, including one or more LEDs capable of producing different colors, e.g. red, green, and blue, as well as a processor for independently controlling the output of the LEDs in order to generate a variety of colors and color-changing lighting effects.

In lighting units, such as those that include LED-based light sources, it is desirable to have control over one or more light sources of the lighting unit. For example, it may be desirable to control which of one or more light sources are illuminated and/or to control one or more lighting parameters of one or more of the light sources. For example, it may be desirable to control color, color temperature, intensity, beam width, and/or beam direction of light output provided by one or more LED-based light sources of an LED-based lighting unit.

Direct specification during configuration of a lighting unit enables control of lighting parameters. However, direct specification may suffer from one or more drawbacks such as lack of ability to fine-tune applied lighting.

A lighting control interface, such as a dimmer, may enable adjustment of one or more lighting parameters of a lighting unit that is in communication with the lighting control interface. However, many lighting control interfaces may suffer from one or more drawbacks. For example, a lighting control interface may be located a significant distance away from a lighting unit and it may not be clear to a user that the lighting control interface controls the desired lighting unit and/or it may not be convenient for a user to interact with the lighting control interface. Also, for example, a lighting control interface may control multiple lighting units and may be unable to adjust one or more lighting parameters of a single lighting unit independently of adjusting lighting parameters of other lighting units. Also, for example, a lighting control interface may be located near a lighting unit that it controls, but it may be unpleasant for a user to interact with the lighting control interface due to high levels of light output from the lighting unit.

Thus, there is a need in the art to provide methods and apparatus that enable control of one or more properties of light output of a lighting unit and that optionally overcome one or more drawbacks of existing approaches.

SUMMARY

The present disclosure is directed to lighting control. More particularly, various inventive methods and apparatus disclosed herein relate to relate to providing reduced intensity light output from one or more light sources based on user proximity. Providing reduced intensity light output from the light sources based on user proximity may facilitate user interaction with a user interface that enables control of the light sources and/or additional light sources. For example, the reduced intensity light output may make viewing of and/or interaction with the user interface more pleasant that non-reduced intensity light output since the user may need to look generally toward the reduced intensity light output when viewing and/or interacting with the user interface.

As one example, in some embodiments a lighting unit is provided with a light source, a user interface, a lighting controller, and a proximity sensor. The lighting controller controls the light output of the light source and/or additional light source(s) based on user interaction with the user interface. For example, the lighting controller may adjust the color of the light output based on user interaction with the user interface. The lighting controller may further monitor output provided by the proximity sensor to determine a user adjustment condition indicative of a user being within a threshold distance of the proximity sensor and likely interacting with and/or preparing to interact with the user interface. In response to determining the user adjustment condition, the lighting controller may control the light source and/or additional light sources to reduce the intensity of light output provided thereby. As described herein, the reduced intensity light output may make viewing of and/or interaction with the user interface more pleasant than non-reduced intensity light output.

Generally, in one aspect, a method of reducing a light output level of at least one light source to assist a user in adjusting light output properties is provided. The method may include the steps of: providing first lighting control output to operate one or more light sources at a first light output level; monitoring a proximity sensor input while the light sources are at the first light output level; determining, based on the proximity sensor input, a user adjustment condition, the user adjustment condition indicative of presence of a user within a threshold distance of the proximity sensor; providing, in response to determining the user adjustment condition, second lighting control output to operate the one or more light sources at a second light output level, the second light output level visibly less intense than the first light output level; receiving a user lighting adjustment input, the user lighting adjustment input being received during the user adjustment condition and while providing the second lighting control output; and determining, based on the user lighting adjustment input, third lighting control output to operate light sources, the third lighting control output distinct from the first and second lighting control outputs.

In some embodiments, the proximity sensor input is based on a proximity sensor of a lighting unit that includes at least one of the one or more light sources. In some embodiments, the method further includes generating the proximity sensor input at a proximity sensor of a lighting unit that includes at least one of the one or more light sources. The method may further include providing the third lighting control output to operate one or more additional light sources.

In some embodiments, the method further includes providing the third lighting control output to the one or more additional light sources during the user adjustment condition. In some versions of those embodiments, during the providing the third lighting control output to the one or more additional light sources during the user adjustment condition, the second lighting control output is provided to operate the one or more light sources at the second light output level.

In some embodiments, the method further includes: determining a cessation of the user adjustment condition and providing the third lighting control output to the one or more light sources in response to determining the cessation of the user adjustment condition. In some versions of those embodiments the method further includes monitoring the proximity sensor input during the user adjustment condition, wherein determining the cessation of the user adjustment condition is based on the proximity sensor input.

In some embodiments, the method further includes providing the third lighting control output to the one or more light sources. In some versions of those embodiments the method further includes providing the third lighting control output to one or more additional light sources.

Other embodiments may include a non-transitory computer readable storage medium storing instructions executable by a processor to perform a method such as one or more of the methods described herein. Yet other embodiments may include a system including memory and one or more processors operable to execute instructions, stored in the memory, to perform a method such as one or more of the methods described herein.

Generally, in another aspect, a lighting unit is provided that includes a light source, a proximity sensor, a user interface, and a lighting controller. The lighting controller receives proximity sensor input from the proximity sensor, receives lighting adjustment input from the user interface, and provides lighting control output to control light output of the light source based on the lighting control output. The lighting controller adjusts the lighting control output to control the light output of the light source based on the lighting adjustment input. The lighting controller determines a user adjustment condition based on the proximity sensor input, wherein the user adjustment condition is indicative of presence of a user within a threshold distance of the proximity sensor. In response to determining the user adjustment condition, the lighting controller temporarily adjusts the lighting control output to lessen the visible intensity of the light output of the light source.

In some embodiments, the lighting unit further includes an electrical fitting engageable with an electrical socket of a lighting fixture. In some versions of those embodiments with the electrical fitting, at least the lighting controller is electrically coupled to the electrical fitting. In some versions of those embodiments with the electrical fitting, the lighting unit further includes a housing that encloses one or both of the light source and the lighting controller. In some versions of those embodiments with the housing, the user interface element is coupled to the housing.

In some embodiments, the light source is an LED and the lighting controller is an LED driver.

In some embodiments, the lighting unit further includes a second light source, wherein the lighting controller provides second lighting control output to control light output of the second light source based on the second lighting control output. In some versions of those embodiments, in response to determining the user adjustment condition, the lighting controller maintains the visible intensity of the second light output of the second light source. In some versions of those embodiments, during the user adjustment condition the lighting controller adjusts the second lighting control output to control the second light output of the second light source based on the lighting adjustment input.

In some embodiments, the lighting controller determines a cessation of the user adjustment condition and the lighting controller adjusts the lighting control output to control the light output of the light source based on the lighting adjustment input in response to determining the cessation of the user adjustment condition.

As used herein for purposes of the present disclosure, the term "LED" should be understood to include any electroluminescent diode or other type of carrier injection/junction-based system that is capable of generating radiation in response to an electric signal and/or acting as a photodiode. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones, and other types of sensors that may receive some form of human-generated stimulus and generate a signal in response thereto.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

In lighting units such as those that include LED-based light sources, it is desirable to have control over one or more light sources of the lighting unit. For example, it may be desirable to control which of one or more light sources are illuminated and/or to control one or more lighting parameters of one or more of the light sources. For example, it may be desirable to control color, color temperature, intensity, beam width, and/or beam direction of light output provided by one or more LED-based light sources of an LED-based lighting unit. Direct specification during configuration of a lighting unit and/or lighting control interfaces may enable adjustment of one or more lighting parameters of a lighting unit. However, direct specification and/or many lighting control interfaces may suffer from one or more drawbacks.

Thus, Applicants have recognized and appreciated that it would be beneficial to achieve reduced intensity light output from one or more light sources based on user proximity in order to facilitate user selection of lighting parameters.

In the following detailed description, for purposes of explanation and not limitation, representative embodiments disclosing specific details are set forth in order to provide a thorough understanding of the claimed invention. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatus and methods may be omitted so as to not obscure the description of the representative embodiments. Such methods and apparatus are clearly within the scope of the claimed invention. For example, aspects of the methods and apparatus disclosed herein are described in conjunction with a lighting unit having a housing enclosing one or more light sources and an Edison type electrical fitting engageable with a socket of a lighting fixture. However, one or more aspects of the methods and apparatus described herein may be implemented in other lighting units that have alternative configurations. For example, aspects described herein may be implemented in lighting units wherein the light sources and/or other components are not enclosed in a housing. Also, for example, aspects described herein may be implemented in lighting units wherein power may be provided to one or more of the components of the lighting unit through a non-Edison type electrical fitting and/or through other electrical connections that are not engageable with a socket of a lighting fixture. Implementation of the one or more aspects described herein in alternatively configured environments is contemplated without deviating from the scope or spirit of the claimed invention.

Figure 1:
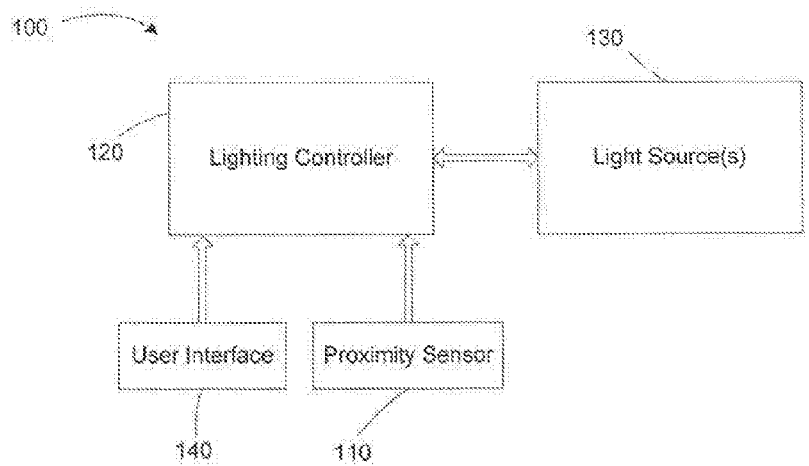
FIG. 1 illustrates a block diagram of an embodiment of a lighting unit.

FIG. 1 illustrates a block diagram of an embodiment of a lighting unit 100. The lighting unit 100 includes a proximity sensor 110, a lighting controller 120, one or more light sources 130, and a user interface 140. The one or more light sources 130 are configured to generate light output. In some embodiments the one or more light sources 130 may comprise, or consist of, one or more LEDs. The lighting controller 120 receives output provided by the proximity sensor 110 and the user interface 140. The user interface 140 may receive some form of human-generated stimulus and generate a user lighting adjustment output in response thereto. The user lighting adjustment output is received at the lighting controller 120 as user lighting adjustment input. Examples of user interface 140 include, but are not limited to, switches, potentiometers, buttons, dials, sliders, a capacitive touch strip, a keyboard, a keypad, etc. Proximity sensor 110 generates proximity sensor output that is received at the lighting controller 120 as proximity sensor input. The proximity sensor input may be utilized by the controller 120 to determine presence of a user and/or other object within a threshold distance of the proximity sensor 110.

As described herein, the lighting controller 120 controls one or more of the light sources 130 of the lighting unit 100 and/or one or more optical elements associated with the light sources 130 based at least in part on input received from the proximity sensor 110 and the user interface 140. For example, the lighting controller 120 may: receive a user lighting adjustment input from the user interface 140 in response to a user interaction with the user interface 140; determine lighting property adjustments for the light sources 130 based on the user lighting adjustment input; and provide lighting control output to control the light sources 130 based on the user lighting adjustment input. Also, for example, the lighting controller 120 may: receive proximity sensor input from the proximity sensor 110; determine, based on the proximity sensor input, a user adjustment condition indicative of presence of a user within a threshold distance of the proximity sensor; and provide lighting control output to control the light sources 130 at a reduced intensity light output level based on the determined user adjustment condition.

Proximity sensor 110 provides proximity sensor output that may be utilized by the controller 120 to determine presence of a user and/or other object within a threshold distance of the proximity sensor 110. In some embodiments the proximity sensor output may be a true/false output that indicates presence and/or non-presence of a user and/or other object within a threshold distance of the proximity sensor. For example, in some embodiments the proximity sensor output may be a "true" value (e.g., a first voltage) when a user and/or other object is within a threshold distance of the proximity sensor and may be a "false" value (e.g., a second voltage or no voltage) when a user and/or other object is not within a threshold distance of the proximity sensor. In some embodiments the proximity sensor output may include more than two values. For example, each value may indicate an estimated distance of the nearest user and/or other object and the controller 120 may utilize the value to determine if the estimated distance satisfies a threshold distance. Also, for example, each value may indicate a likelihood that a user and/or other object is within a threshold distance of the proximity sensor and the controller 120 may utilize the value to determine if the likelihood satisfies a threshold likelihood.

The proximity sensor 110 may include one or more apparatus that utilize one or more techniques to provide output that may be utilized by the controller 120 to determine presence of a user and/or other object within a threshold distance of the proximity sensor 110. The proximity sensor 110 may include one or more components that may be coupled to and/or embedded in one or more components of the lighting unit 100 such as a heatsink of the lighting unit 100, a bulb type housing of the lighting unit 100, etc. In some embodiments the proximity sensor 110 may be coupled to and/or embedded in an outer periphery of the lighting unit 100 or in a location that enables transmission and/or receipt of signals through a light exit window of the lighting unit (e.g., a transparent or translucent bulb type housing).

For example, in some embodiments the proximity sensor 110 may be a capacitive sensor that utilizes a heatsink of the lighting unit 100 and/or a transparent patch of indium tin oxide (ITO) on an outer surface of the lighting unit 100 as a key. Also, for example, in some embodiments the proximity sensor 110 may be an ultra-sonic Doppler transmitter and receiver that uses time of flight techniques to determine distance to an object. Also, for example, in some embodiments the proximity sensor 110 may be a radar transmitter and receiver that uses time of flight techniques to determine distance to an object. Also, for example, in some embodiments the proximity sensor 110 may be an infra-red reflection distance sensor receiver that measures distance to an object. Also, for example, in some embodiments the proximity sensor 110 may be an infra-red passive sensor (PIR) that detects a heat source (such as a user's hand). Also, for example, in some embodiments the proximity sensor 110 may be light reflection sensor that detects presence and/or distance of an object based on reflections of light output of the light sources 130. Also, for example, in some embodiments the proximity sensor 110 may be a camera and one or more signals from the camera may be utilized to detect presence and/or distance of an object. For example, signals from a depth camera may be utilized to determine an object in the shape of a hand is approaching. Also, for example, signals from a camera may be utilized to determine movement and the movement may be assumed or determined to be human movement. Also, for example, signals from a camera may be utilized to determine presence of a heart beat for example, by monitoring changes in reflected light from a hand and/or other body part of a user. In some embodiments proximity sensor may include one or more controllers to determine presence, distance, and/or other values. In some embodiments lighting controller 120 may additionally and/or alternatively determine presence, distance, and/or other values based on proximity sensor input provided by the proximity sensor 110.

In some embodiments, any threshold distance utilized by the proximity sensor 110 and/or the controller 120, and/or a detection range of the proximity sensor 110 may be set to a distance so that false positives are minimized. For example, in some embodiments a threshold distance and/or a range of the proximity sensor 110 may be set to less than 100 cm, such as less than 50 cm or less than 40 cm.

As described herein, in some embodiments the lighting unit 100 may integrate the proximity sensor 110, the lighting controller 120, the light sources 130, and the user interface 140 in a cohesive package. For example, the lighting unit 100 may include a bulb type housing and an electrical fitting coupled to the bulb type housing. The components of FIG. 1 may be enclosed in the bulb type housing and/or the electrical fitting and/or provided on and/or as part of the bulb type housing and/or the electrical fitting. For example, the components of FIG. 1 may be implemented in a lighting unit having a standard size electrical fitting such as, for example, E27, E14, MR16, GU10, etc. In some other embodiments one or more of the proximity sensor 110, the lighting controller 120, and/or the user interface 140 may be provided separate from the lighting unit. For example, the lighting controller 120 may be provided remote from the lighting unit and may be in communication (e.g., wired or wireless communication) with the proximity sensor 110, the user interface 140, the light sources 130, and/or a driver for the light sources 130.

The lighting controller 120 may include and/or access a storage subsystem containing programming and data constructs that provide the functionality of some or all of the modules described herein. For example, the storage subsystem may include the logic to perform one or more of the steps of FIG. 2. The modules implementing the functionality of certain embodiments are generally executed by lighting controller 120, alone or in combination with other controllers (e.g., distributed processing). Memory may be used in a storage subsystem of lighting controller 120 and may be accessed by lighting controller 120. Memory can include a number of memories including a main random access memory (RAM) for storage of instructions and data during program execution and a read only memory (ROM) in which fixed instructions are stored.

In some embodiments the light sources 130 are driven by one or more drivers and the lighting controller 120 communicates with the one or more drivers to control the light sources 130. In some embodiments the lighting controller 120 may form part of the driver for light sources 130. In some embodiments, such as those where the lighting controller 120 is provided remote from the lighting unit 110, the lighting controller 120 communicates with one or more local lighting controllers of the lighting unit 110 to control the light sources 130. For example, a plurality of local lighting controllers may be provided, each controlling one or more light sources 130 of the lighting unit 110. In some embodiments the lighting controller 120 itself may include a plurality of local controllers, each controlling one or more light sources 130 of the lighting unit 110. Embodiments including multiple lighting controllers may optionally incorporate wired and/or wireless communication between the multiple lighting controllers.

In some embodiments the light sources 130 may include a plurality of LED groupings each including one or more LEDs. One or more aspects of the control of each of the LED groupings may optionally be specific to the individual LED grouping. For example, the intensity, color, beam width, and/or beam direction of one or more LED groupings may be individually controlled. For example, the lighting controller 120 may only reduce the intensity of the light output one or more LED groupings based on a determined user adjustment condition, while maintaining the intensity of the light output of one or more other LED groupings. Also, for example, the user interface 140 may be used to only adjust one or more parameters of one or more LED groupings, without affecting one or more other LED groupings. Also, for example, the lighting controller 120 may apply lighting adjustments responsive to input via the user interface 140 to one or more LED groupings during a user adjustment condition (thereby enabling the user to "preview" the lighting adjustments), while maintaining one or more other LED groupings at a reduced light output intensity during the user adjustment condition.

Figure 2:
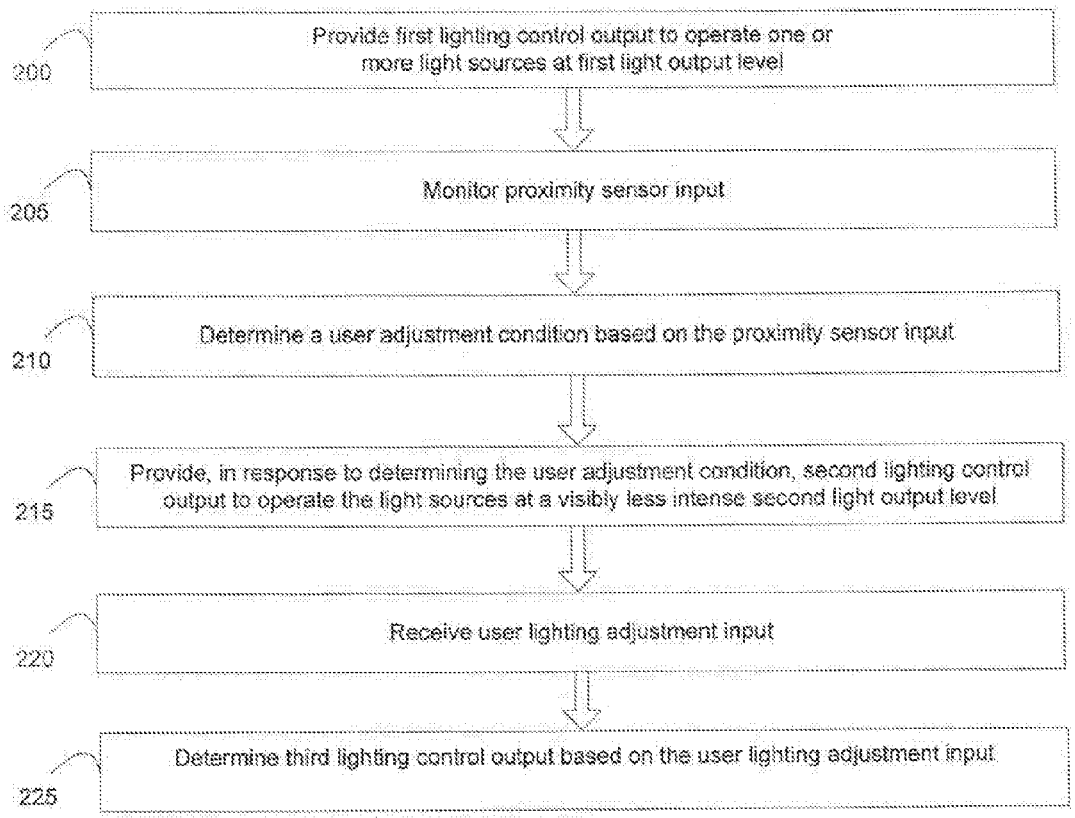
FIG. 2 illustrates a flow chart of an example method of providing reduced intensity light output based on user proximity.

Referring to FIG. 2, a flow chart of an example method of providing reduced intensity light output based on user proximity is illustrated. Other implementations may perform the steps in a different order, omit certain steps, and/or perform different and/or additional steps than those illustrated in FIG. 2. For convenience, aspects of FIG. 2 will be described with reference to one or more components that may perform the method. The components may include, for example, one or more of the components of lighting unit 100 of FIG. 1 and/or one or more components of FIGS. 3A-4B. Accordingly, for convenience, aspects of FIGS. 1 and 3A-4B will be described in conjunction with FIG. 2.

At step 200, first lighting control output is provided to operate one or more light sources at a first light output level. For example, the lighting controller 120 may provide first lighting control output to operate one or more of the light sources 130 at a first light output level. The first light output level may be a light output level previously set by the user (e.g., in a previous iteration of the method of FIG. 2), a default light output level, and/or a light output level based on one or more other inputs (e.g., a daylight sensor). In some embodiments the lighting controller 120 may be implemented in a driver of the lighting unit 100 and providing the first lighting control output may include adjusting one or more characteristics of a driving voltage such as, for example, adjusting a direct current voltage supplied to the light sources 130 when the light sources 130 are LEDs.

Figure 3A:
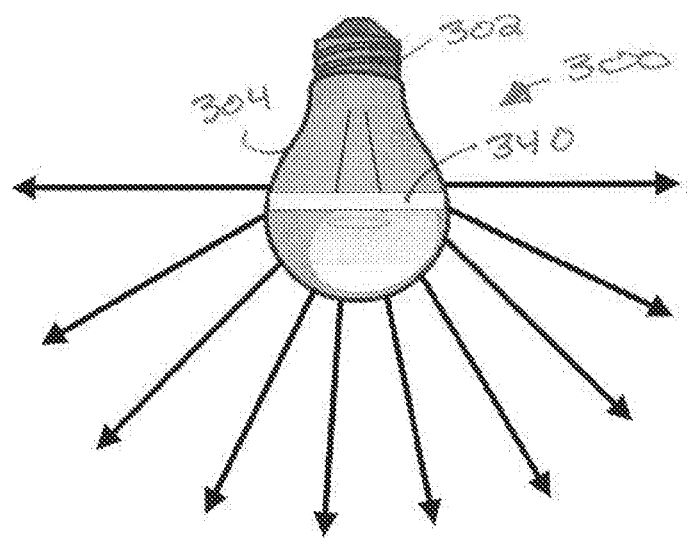
FIG. 3A illustrates an example lighting unit providing light output.

As another example, a lighting controller of a lighting unit 300 of FIG. 3A may provide first lighting control output to operate one or more light sources of the lighting unit 300 at a first light output level and generate a first light output. The first light output is generally represented by the directional arrows of FIG. 3A that are emanating from a bulb type housing 304 of the lighting unit 300. The lighting controller of lighting unit 300 may be, for example, enclosed in the electrical fitting 302 and/or the bulb type housing 304 of the lighting unit 300.

Figure 4A:
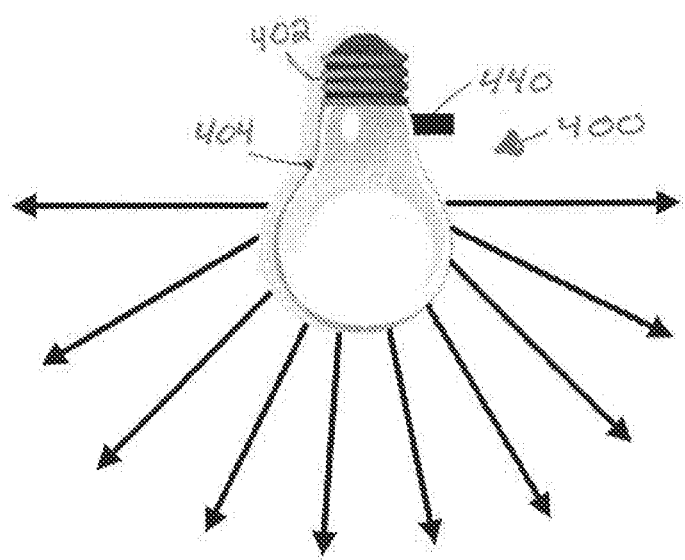
FIG. 4A illustrates another example lighting unit providing light output.

As yet another example, a lighting controller of a lighting unit 400 of FIG. 4A may provide first lighting control output to operate one or more light sources of the lighting unit 400 at a first light output level and generate a first light output. The first light output is generally represented by the directional arrows of FIG. 4A that are emanating from a bulb type housing 404 of the lighting unit 400. The lighting controller of lighting unit 400 may be, for example, enclosed in the electrical fitting 402 and/or the bulb type housing 404 of the lighting unit 400.

At step 205, proximity sensor input is monitored. For example, the lighting controller 120 may monitor proximity sensor input provided by the proximity sensor 110. As another example, a lighting controller of a lighting unit 300 of FIG. 3A may monitor proximity sensor input provided by a proximity sensor of the lighting unit 300. The proximity sensor of lighting unit 300 may be, for example, enclosed in the bulb type housing 304 of the lighting unit 300 with a view through a light transmissive portion of the bulb type housing 304. As yet another example, a lighting controller of a lighting unit 400 of FIG. 4A may monitor proximity sensor input provided by a proximity sensor of the lighting unit 400. The proximity sensor of lighting unit 400 may be, for example, enclosed in the bulb type housing 404 of the lighting unit 400 with a view through a light transmissive portion of the bulb type housing 404.

At step 210, a user adjustment condition is determined based on the proximity sensor input. For example, the lighting controller 120 may determine the user adjustment condition based on the proximity sensor input provided by the proximity sensor 110. The user adjustment condition is indicative of presence of a user within a threshold distance of the proximity sensor 110. For example, the proximity sensor input from the proximity sensor 110 may be a true/false input that indicates presence and/or non-presence of a user and/or other object within a threshold distance of the proximity sensor 110 and the controller 120 may determine a user adjustment condition when a "true" value is provided. Also, for example, the proximity sensor input from the proximity sensor 110 may indicate an estimated distance of the nearest user and/or other object and the controller 120 may determine a user adjustment condition if the estimated distance satisfies a threshold distance.

Figure 3B:
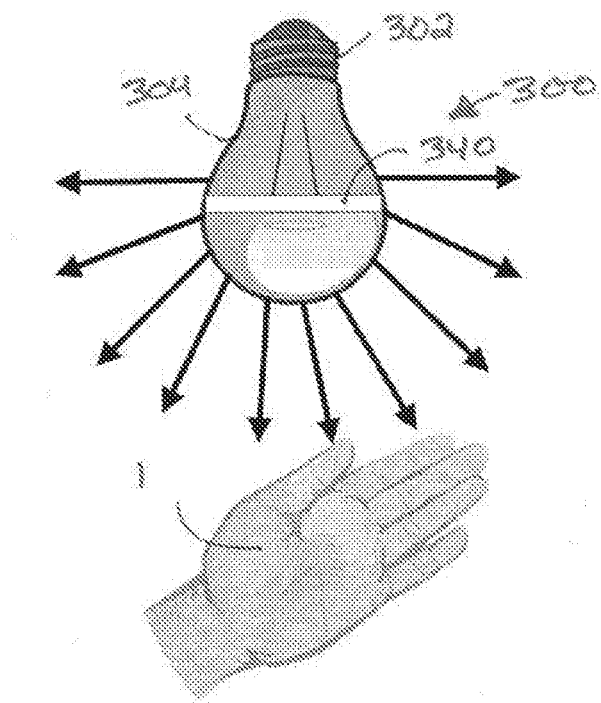
FIG. 3B illustrates the example lighting unit of FIG. 3A providing reduced intensity light output based on user proximity.

As another example, a lighting controller of the lighting unit 300 of FIGS. 3A and 3B may determine the user adjustment condition based on the proximity sensor input provided by a proximity sensor of the lighting unit 300. For example, the proximity sensor of the lighting unit 300 may provide proximity sensor output indicative of presence of the user's hand 1 (FIG. 3B) within a threshold distance of the proximity sensor. As yet another example, a lighting controller of the lighting unit 400 of FIGS. 4A and 4B may determine the user adjustment condition based on the proximity sensor input provided by a proximity sensor of the lighting unit 400. For example, the proximity sensor of the lighting unit 400 may provide proximity sensor output indicative of presence of the user's hand 1 (FIG. 4B) within a threshold distance of the proximity sensor.

At step 215, second lighting control output is provided to operate the light sources at a visibly less intense second light output level. For example, the lighting controller 120 may provide second lighting control output to operate one or more of the light sources 130 at a second light output level. The second light output level may be a set light output level and/or based on one or more other factors. For example, in some embodiments the second light output level may be a percentage of the maximum light output level such as 25%. Also, for example, in some embodiments the second light output level may be a percentage of the first light output level of step 200. For example, if the first light output level of step 200 is 80% of maximum, then the second light output level may be 25% of the first light output level (20% of the maximum light output level). In some embodiments the lighting controller 120 may be implemented in a driver of the lighting unit 100 and providing the second lighting control output may include adjusting one or more characteristics of a driving voltage such as, for example, adjusting a direct current voltage supplied to the light sources 130 when the light sources 130 are LEDs.

In some embodiments, second lighting control output may be provided to all of the light sources of a lighting unit to operate all of the light sources 130 at a visibly less intense light output level. In some versions of those embodiments all of the light sources may be operated at the same visibly less intense light output level (e.g., all 20% of maximum). In some other versions of those embodiments the light sources may be operated at various visibly less intense light output levels (e.g., one or more light sources at 20% of maximum, one or more light sources at 30% of maximum).

As one example, a lighting controller of a lighting unit 300 of FIG. 3B may provide second lighting control output to operate all of the light sources of the lighting unit 300 at a second light output level and generate a second light output. The second light output is generally represented by the directional arrows of FIG. 3B that are emanating from the bulb type housing 304 of the lighting unit 300. The length of the directional arrows of FIGS. 3A and 3B generally correspond to the intensity of light output. Accordingly, the directional arrows of FIG. 3B represent a visibly less intense light output than the directional arrows of FIG. 3A.

In some embodiments, second lighting control output may be provided to a subset of the light sources of a lighting unit to operate the subset of the light sources 130 at a visibly less intense light output level. In some versions of those embodiments all of the light sources of the subset may be operated at the same visibly less intense light output level (e.g., all 20% of maximum). In some other versions of those embodiments the light sources of the subset may be operated at various visibly less intense light output levels (e.g., one or more light sources of the subset at 20% of maximum, one or more light sources of the subset at 30% of maximum).

Figure 4B:
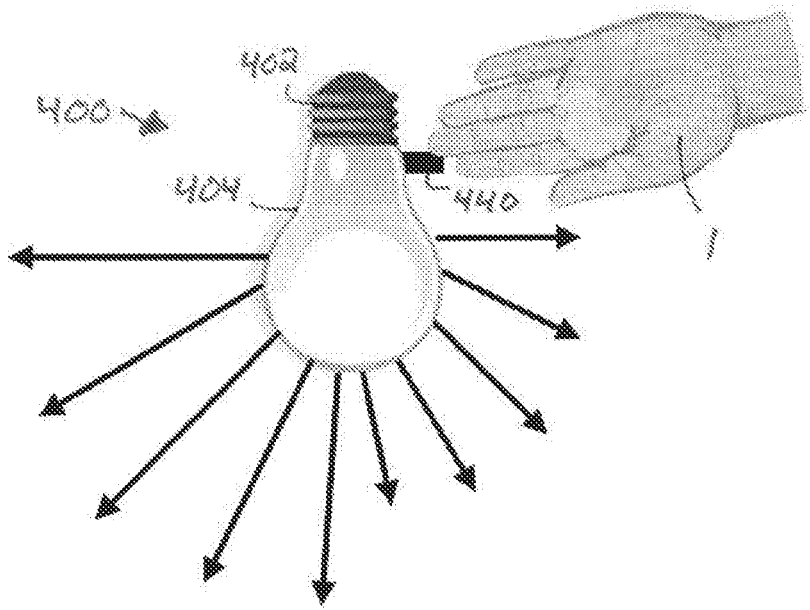
FIG. 4B illustrates the example lighting unit of FIG. 4A providing reduced intensity light output based on user proximity.

As one example, a lighting controller of a lighting unit 400 of FIG. 4B may provide second lighting control output to operate a subset of the light sources of the lighting unit 400 at a second light output level and generate a second light output. The second light output is generally represented by the shorter directional arrows of FIG. 4B that are emanating from the bulb type housing 404 of the lighting unit 400. The length of the directional arrows of FIGS. 4A and 4B generally correspond to the intensity of light output. Accordingly, the shorter directional arrows of FIG. 4B represent a visibly less intense light output than the corresponding directional arrows of FIG. 4A, whereas the longer directional arrows of FIG. 4B represent the same intensity of light output of the corresponding directional arrows of FIG. 4A.

In some embodiments, where second lighting control output is provided to operate a subset of the light sources at a second light output level, the subset may be determined based on a mapping of the subset to the proximity sensor. For example, in FIG. 4B the subset may be mapped to the proximity sensor since the subset produces light output that is generally in the direction of the view of a user that would be adjusting a user interface element 440 of the lighting unit 400. Also, for example, in FIGS. 4A and 4B two or more proximity sensors may be provided, and a first proximity sensor may provide proximity sensor output in FIG. 4B that indicates presence of the hand 1, whereas a second proximity sensor may provide proximity sensor output in FIG. 4B that does not indicate the presence of the hand 1. The first proximity sensor may be mapped to the subset that produces the light output represented by the shorter directional arrows of FIG. 4B.

In some embodiments, where second lighting control output is provided to operate a subset of the light sources at a second light output level, the subset may be determined based on optional directional information included in the proximity sensor input. For example, in FIGS. 4A and 4B the proximity sensor may provide proximity sensor output that indicates the direction at which the hand 1 is detected and the visible intensity of one or more light sources that correspond to that direction may be reduced. For example, the proximity sensor output may indicate the direction of the hand 1 and that direction may be mapped to the subset that produces the light output represented by the shorter directional arrows of FIG. 4B. Also, for example, in some embodiments the proximity sensor may be a camera sensor that provides proximity sensor output that indicates the location of a user's eyes in an image of the camera. The location of the user's eyes may be utilized to determine a direction at which the user is located and/or from which a user's hand may approach and the visible intensity of one or more light sources that correspond to that direction may be reduced.

At step 220, user lighting adjustment input is received. For example, the lighting controller 120 may receive user lighting adjustment input provided by the user interface 140 in response to user interaction with the user interface 140. As another example, a lighting controller of a lighting unit 300 of FIG. 3A may receive user lighting adjustment input provided via the touch-strip user interface 340 in response to user contact with the touch-strip user interface 340 (e.g., tapping, swiping, and/or other user contact). As yet another example, a lighting controller of a lighting unit 400 of FIG. 4A may receive user lighting adjustment input provided by the adjustment knob user interface 440 in response to user contact with the adjustment knob user interface 440 (e.g., rotating the adjustment knob user interface 440).

In some embodiments, if user lighting adjustment input is not received at step 220, the method proceeds back to step 200. In some versions of those embodiments, the method proceeds back to step 200 if user lighting adjustment input is not received and cessation of the user adjustment condition is determined based on the proximity sensor input. For example, as described herein, in some embodiments cessation of the user adjustment condition may be determined when the proximity sensor input is no longer indicative of presence of a user within a threshold distance of the proximity sensor 110. In some versions of the embodiments where the method proceeds back to step 200, the method additionally or alternatively proceeds back to step 200 if user lighting adjustment input is not received within a threshold time period of determining the user adjustment condition.

At step 225 third lighting control output is determined based on the user lighting adjustment input received at step 220. For example, the lighting controller 120 may determine third lighting control output that is determined based on the user lighting adjustment input received at step 220 to operate one or more of the light sources 130 with an adjusted light output level and/or other light output parameter. In some situations the operation of the light sources 130 based on the third lighting control output may produce a light output from the lighting unit 100 that is distinct from the first light output of step 200 and/or the second light output of step 215.

The third lighting control output that is determined based on the user lighting adjustment input received at step 220 may, when applied, activate and/or deactivate one or more of the light sources and/or adjust one or more light output parameters of light output provided by one or more of the light sources 130 such as the intensity, color, beam width, and/or beam direction of the light output. The third lighting control output may be provided to control one or more of the light sources 130. For example, the lighting controller 120 may provide the third lighting control output and the third lighting control output may cause one or more of, activation of one or more light sources 130, deactivation of one or more light sources 130, changing light output characteristics (e.g., color, brightness, color temperature) of one or more light sources, and/or altering one or more mechanical and/or electrical optical structures associated with one or more light sources (e.g., repositioning optical lenses associated with one or more LEDs, changing optical characteristics of one or more optical lenses). One of ordinary skill in the art, having had the benefit of the present disclosure, will recognize and appreciate that additional and/or alternative adjustments may be made in response to user interaction with a user interface of a lighting unit.

One of ordinary skill in the art, having had the benefit of the present disclosure, will also recognize and appreciate that steps 220 and/or 225 may be iteratively performed during a user adjustment condition. For example, user lighting adjustment input may be received at step 220, third lighting control output determined based on the user lighting adjustment input at step 225, then further user lighting adjustment input may be received at step 220, and a new third lighting control output determined based on the further user lighting adjustment input.

In some embodiments, the lighting controller 120 may be implemented in a driver of the lighting unit 100 and providing the third lighting control output may include adjusting one or more characteristics of a driving voltage. For example, a direct current voltage supplied to the light sources 130 may be adjusted when the light sources 130 are LEDs. Also, for example, a direct current voltage supplied to one or more channels of a multi-channel light source may be adjusted when the lighting unit is a multi-channel lighting unit to, for example, alter the color of the light output provided by the lighting unit.

In some embodiments, the third lighting control output may be provided in response to determining cessation of the user adjustment condition. In some embodiments cessation of the user adjustment condition may be determined by the controller 120 based on continued monitoring of the proximity sensor input. The controller 120 may determine cessation of the user adjustment condition when the proximity sensor input is no longer indicative of presence of a user within a threshold distance of the proximity sensor 110. Optionally, the controller 120 may determine cessation of the user adjustment condition when the proximity sensor input is no longer indicative of presence of a user within a threshold distance of the proximity sensor 110 for at least a threshold time period (e.g., two seconds). In some embodiments cessation of the user adjustment condition may additionally or alternatively be determined by the controller 120 based on not receiving any further user lighting adjustment input within a threshold time period (e.g., two seconds). In some embodiments cessation of the user adjustment condition may additionally or alternatively be determined by the controller 120 based on explicit user feedback received via the user interface 140 such as a double tap when the user interface 140 is a touch sensitive user interface. In some versions of these embodiments, once cessation of the user adjustment condition is determined, the method may proceed back to step 200 and the third lighting control output may be set as the first lighting control input.

In some embodiments, the third lighting control output may be provided to one or more of the light sources during the user adjustment condition. For example, in some embodiments the controller 120 may provide the third lighting control output to a subset of the light sources 130 during the user adjustment condition to enable the user to "preview" the lighting adjustments, then provide the third lighting control output to other light sources 130 upon determination of cessation of the lighting adjustment condition. In some embodiments the subset of the light sources to which the third lighting control output is provided during the user adjustment condition may be one or more of the light sources that are not members of the optional subset determined at step 215 to which the second lighting control output is provided (e.g., the subset mapped to the proximity sensor input of step 205 and/or mapped to a direction indicated by the proximity sensor input of step 205). As one example, with reference to FIG. 4B, a controller of the lighting unit 400 may provide third lighting control output during the user adjustment condition to one or more of the light sources that generate the light output of the longer directional arrows of FIG. 4B, while maintaining a reduced intensity light output via the one or more of the light sources that generate the light output of the shorter directional arrows of FIG. 4B. This may enable the user to preview lighting adjustments made via user interface 440, while maintaining a reduced intensity light output via the one or more of the light sources that direct light generally in the direction of the user, thereby preventing potentially unpleasant levels of light from being directed at the user during the user adjustment condition.

As another example of providing the third lighting control output to one or more of the light sources during the user adjustment condition, in some embodiments the controller 120 may provide the third lighting control output to one or more of the light sources 130 during the user adjustment condition, while optionally maintaining a reduced intensity light output via one or more of the light sources 130. For example, in some embodiments the third lighting control output may adjust the color of the light output and the adjusted color of the light output may be applied to the light sources 130 while maintaining the light sources 130 at the reduced intensity light output. Upon determination of cessation of the lighting adjustment condition, the adjusted color of the light output may continue to be applied and the light output of the light sources 130 adjusted back to the non-reduced intensity light output level.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited. Also, reference numerals appearing in the claims between parentheses, if any, are provided merely for convenience and should not be construed as limiting the claims in any way.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of reducing a light output level of at least one light source to assist a user in adjusting light output properties, comprising:
    providing first lighting control output to operate one or more light sources at a first light output level;
    monitoring a proximity sensor input while the light sources are at the first light output level;
    determining, based on the proximity sensor input, a user adjustment condition, the user adjustment condition indicative of presence of a user within a threshold distance of the proximity sensor;
    providing, in response to determining the user adjustment condition, second lighting control output to operate the one or more light sources at a second light output level, the second light output level visibly less intense than the first light output level;
    receiving a user lighting adjustment input independently of said proximity sensor input, the user lighting adjustment input being received during the user adjustment condition and while providing the second lighting control output; and
    determining, based on the user lighting adjustment input, third lighting control output to operate at least one of the one or more light sources or one or more additional light sources, the third lighting control output distinct from the first and second lighting control outputs.

2. The method of claim 1, further comprising providing the third lighting control output to the one or more additional light sources during the user adjustment condition.

3. The method of claim 2, wherein during the providing the third lighting control output to the one or more additional light sources during the user adjustment condition, the second lighting control output is provided to operate the one or more light sources at the second light output level.

4. The method of claim 1, further comprising:
    determining a cessation of the user adjustment condition; and
    providing the third lighting control output to the one or more light sources in response to determining the cessation of the user adjustment condition.

5. The method of claim 4, further comprising:
    monitoring the proximity sensor input during the user adjustment condition;
    wherein determining the cessation of the user adjustment condition is based on the proximity sensor input.

6. A lighting unit, comprising:
    a light source;
    a proximity sensor;
    a user interface; and
    a lighting controller receiving proximity sensor input from the proximity sensor and receiving lighting adjustment input from the user interface independently of the proximity sensor input, the lighting controller providing lighting control output to control light output from the light source based on the lighting control output;
    wherein the lighting controller adjusts the lighting control output to adjust the light output from the light source during operation of the light source based on the lighting adjustment input;
    wherein the lighting controller determines a user adjustment condition based on the proximity sensor input, wherein the user adjustment condition is indicative of presence of a user within a threshold distance of the proximity sensor; and
    wherein, in response to determining the user adjustment condition, the lighting controller temporarily adjusts the lighting control output to lessen the visible intensity of the light output from the light source.

7. The lighting unit of claim 6, further comprising an electrical fitting engageable with an electrical socket of a lighting fixture.

8. The lighting unit of claim 7, further comprising a housing, the housing enclosing one or both of the light source and the lighting controller.

9. The lighting unit of claim 8, wherein the user interface element is coupled to the housing.

10. The lighting unit of claim 7, wherein at least the lighting controller is electrically coupled to the electrical fitting.

11. The lighting unit of claim 6, wherein the light source is an LED and the lighting controller is an LED driver.

12. The lighting unit of claim 6, further comprising a second light source, wherein the lighting controller provides second lighting control output to control light output of the second light source based on the second lighting control output.

13. The lighting unit of claim 12, wherein, in response to determining the user adjustment condition, the lighting controller maintains the visible intensity of the second light output of the second light source.

14. The lighting unit of claim 12, wherein during the user adjustment condition the lighting controller adjusts the second lighting control output to control the second light output of the second light source based on the lighting adjustment input.

15. The lighting unit of claim 6, wherein the lighting controller determines a cessation of the user adjustment condition; and wherein the lighting controller adjusts the lighting control output to control the light output from the light source based on the lighting adjustment input in response to determining the cessation of the user adjustment condition.

\* \* \* \* \*